E. BAUER.
SYSTEM OF ELECTRICAL REGULATION.
APPLICATION FILED JAN. 25, 1918.

1,380,764.

Patented June 7, 1921.

WITNESS:
Romaine A. Kinne
Ralph Munden

INVENTOR.
Ernst Bauer
BY Raymond H. Van Vast
ATTORNEY.

UNITED STATES PATENT OFFICE.

ERNST BAUER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL REGULATION.

1,380,764.     Specification of Letters Patent.     Patented June 7, 1921.

Application filed January 25, 1918. Serial No. 213,620.

*To all whom it may concern:*

Be it known that I, ERNST BAUER, a citizen of the United States, residing at Niagara Falls, in the county of Niagara and State of New York, have invented new and useful Improvements in Systems of Electrical Regulation, of which the following is a specification.

The present invention relates to systems of electrical regulation.

More particularly the present invention relates to systems of electrical regulation applicable to electric lighting of railway cars wherein energy is taken from the car axle to drive a generator which supplies a storage battery and translation circuit in parallel. Inasmuch as it is necessary to charge a storage battery at higher voltage than will be delivered by said battery on discharge, it is common to provide resistance means in the circuit of the translation devices to cut down the voltage to said translation devices when the generator is charging the storage battery. Such resistance means often takes the form of a compressible rheostat. When the generator is inoperative and the storage battery is not in a highly charged state, the resistance of the compressible rheostat should be a minimum. Difficulty has been experienced in practice, in reducing the resistance of the rheostat to a sufficiently low value under the conditions referred to.

An object of the present invention is to provide a system involving a variable speed generator, a storage battery and a translation circuit, together with compressible pile means for regulating the voltage upon the lamp circuit, in which system a wide range of regulation may be provided for.

A further object is to provide a system of the kind referred to in which the resistance of the compressible pile may be reduced to a minimum when the voltage across the battery is reduced to a predetermined value and wherein, upon rise in said battery voltage, the compressible pile will have its resistance varied to hold a substantially constant voltage across the translation circuit.

A further object is to provide a system of the kind referred to in which a minimum variation in the voltage across the translation circuit will occur when the load is transferred from the battery to the generator, or vice versa.

A further object is to provide a system of the kind referred to involving only simple mechanism which is very little likely to get out of order.

Further objects will be apparent as the description proceeds.

Referring to the drawings:—

Figure 1:
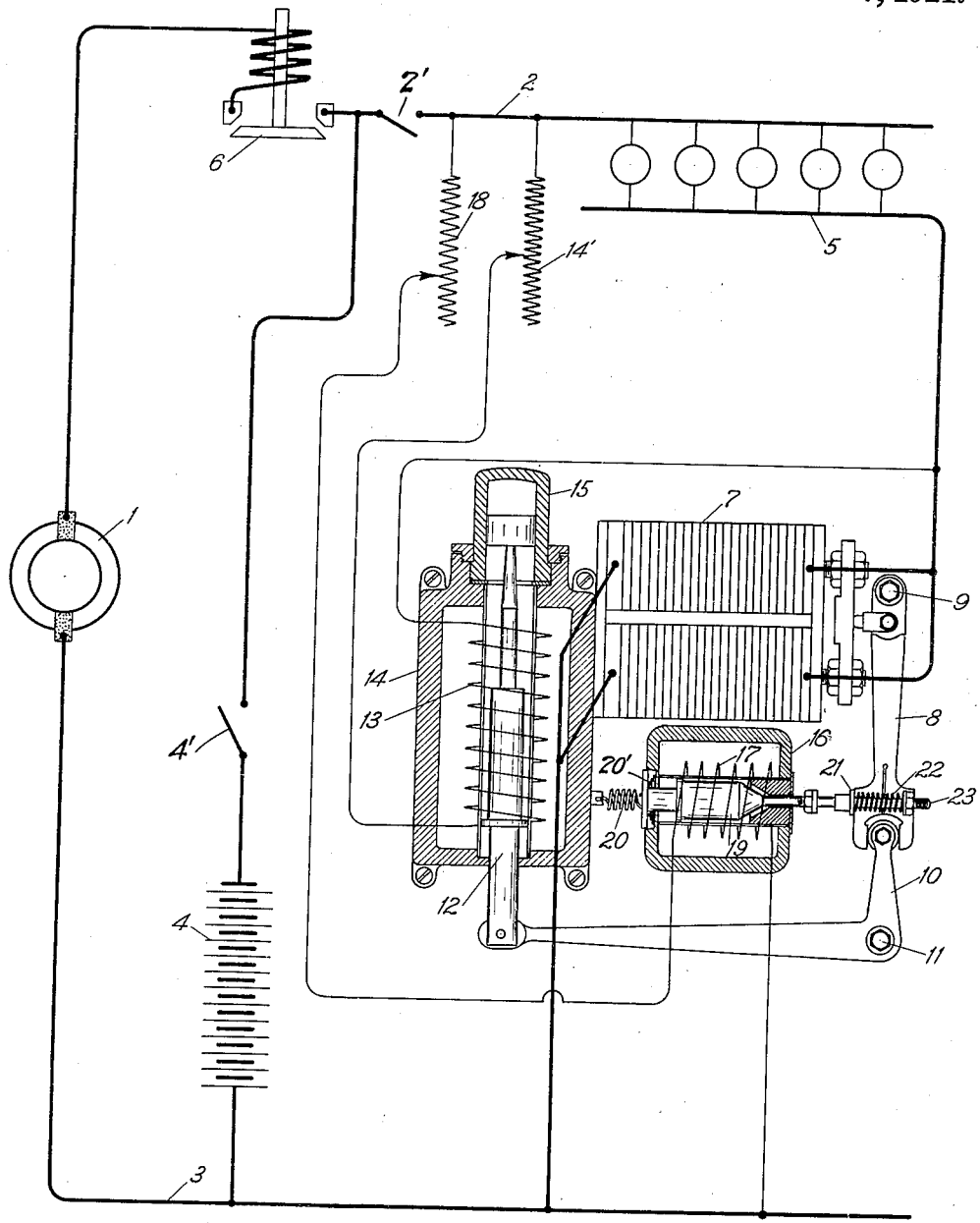
Figure 1 represents schematically one embodiment of the present invention.

A variable speed generator which may be driven from the axle of a car is represented by the numeral 1. Said generator 1 is adapted to supply mains 2 and 3, across which may be connected a storage battery 4 and a translation circuit 5. An automatic switch 6 will be inserted between the generator 1 and storage battery 4. Said automatic switch may be of any preferred construction, but should operate automatically to close the circuit between the generator and storage battery when the voltage developed by the generator is substantially equal to or greater than that developed by the storage battery and should automatically open when the voltage of the generator falls below the voltage developed by the storage battery. A switch 2' may be provided in the main 2, between the battery and the translating devices. A switch 4' may be provided in the battery circuit.

In the translation circuit 5 is a compressible rheostat 7 represented in the drawing as consisting of a pair of compressible piles connected in parallel. It will be understood that the invention is not limited to a pair of compressible piles but is applicable to a rheostat having any desired number of piles. Said rheostat 7 is adapted to be operated by the lever 8 pivoted at the point 9. The lever 8 is in turn adapted to be operated by a bell crank lever 10 pivoted at the point 11. Said bell crank lever 10 is controlled by a plunger 12. Said plunger 12 is adapted to be operated by a solenoid 13 which may be connected across the translation circuit 5 through an adjustable resistance 14'. Said solenoid 13 may be mounted within a suitable frame 14'. The plunger 12 may have its motion damped by means of the dashpot 15, if desired.

Figure 2:
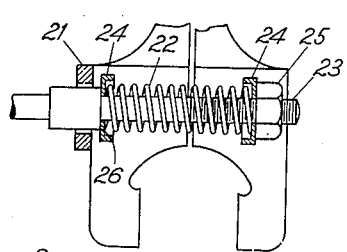
Fig. 2 represents a detail.

The lever 8 is adapted to be controlled by the magnet 16. Said magnet 16 is provided with a solenoid 17 which may be connected across the battery circuit through adjustable resistance 18. Said solenoid 17 is adapted to move a plunger 19 against the tension of a spring 20. The lever 8 is provided with an upstanding lug 21 which is adapted to coöperate with a spring 22, represented in larger scale in Fig. 2. Said spring 22 is mounted upon a rod 23 which is fastened to and adapted to move with the plunger 19. Said spring 22 may be mounted between caps 24, 24, one of which caps may abut against adjustable nut 25 on the end of the rod 23 and the other of which caps may abut against lug 21. The cap 24 adjacent the lug 21 is adapted to abut against a shoulder 26 on the rod 23. As will be apparent from the drawing, the rod 23 is adapted to extend through a hole in the lug 21. The spring 22 should be so designed that when the plunger 19 and rod 23 are moved to the right, the shoulder 26 will move the left hand cap 24 out of engagement with the lug 21, whereby the lever 8 may move independently of said plunger 19 and the rod 23. However, when plunger 19 is drawn to the left, the left hand cap 24 will coöperate with the lug 21 to move the lever 8 in a direction to compact the compressible rheostat 7.

The magnet 16 should be of the type known as short pull magnet. Such magnets are well known in the art and need not be described herein. It will be sufficient to state that said magnet 16 should exert a strong pull against the spring 20 in a short distance of travel. Any preferred means may be provided for adjusting the magnet 16 whereby the tension of spring 20 may be overcome at the proper voltage. If preferred, the conical spring 20' may be provided to supplement spring 20. Said conical spring 20' may be designed to compensate for the increasing attractive effect of the short pull magnet 16 as the plunger 19 reaches its attracted position.

A mode of operation of the above described embodiment of the present invention is substantially as follows: When the generator is inoperative, the demands of the translation circuit will be supplied by the storage battery 4, automatic switch 6 being open at this time. Unless the battery is at this time very highly charged, the resistance of the compressible rheostat 7 should be a minimum. The voltage developed at the terminals of the storage battery being practically equal to or only slightly greater than the normal voltage across the translation circuit 5, the solenoid 17 will not be sufficiently energized to exert a strong pull against spring 20. Spring 20 will therefore urge plunger 19 and rod 23 toward the left, whereby said rod 23, acting through spring 22 and lug 21 will urge lever 8 to tightly compress the compressible rheostat 7 whereby to reduce its resistance to a minimum. Only a very small drop in voltage will occur, therefore, between the battery 4 and translation circuit 5. When the generator 1 develops a voltage sufficient to cause the closing of the automatic switch 6, the voltage impressed upon solenoid 17 will increase, whereby said solenoid 17 will exert its effect in opposition to the spring 20 and will draw the plunger 19, with the rod 23, toward the right, removing the left hand cap 24 out of engagement with the lug 21 on the lever 8. Such action will leave the lever 8 free to be operated by the solenoid 13 through plunger 12 and bell crank lever 10, whereby to control the resistance of the compressible rheostat 7 to maintain the voltage across the translation circuit 5 at a substantially constant value. The transition from a state of tight compression to the various conditions of compression necessary for proper regulation will be gradual and will result in no substantial variations in voltage across the translation circuit.

No means for regulating the generator 1 or for protecting the battery 4 from overcharge have been disclosed, inasmuch as no such means come within the scope of the present invention. Any of the well known means for producing such actions may be used, if desired.

One embodiment of the present invention has been described in detail. Many modifications will occur to those skilled in the art. It is intended in this patent to cover all such modifications that come within the scope of the present invention as defined in the appended claims.

What I claim as new and desire to secure by Letters Patent of the United States, is—

1. In combination, a compressible rheostat, electro-magnetic means for controlling the compression of said rheostat, resilient means for tightly compressing said rheostat, and electro-magnetic means for overcoming said resilient means whereby said first mentioned electro-magnetic means may control said rheostat.

2. In combination, a compressible rheostat, a movable member for controlling said rheostat, resilient means for urging said member to compress said rheostat, electro-magnetic means for overcoming said resilient means, and other electromagnetic means for directly controlling said member.

3. In combination, a compressible pile, a translation circuit, means for tightly compressing said pile, electro-magnetic means for rendering said means inoperative, and electro-magnetic means for controlling said pile for regulating purposes.

4. In combination, a compressible pile, a member for operating said pile, a plunger controlling said member, said plunger being biased to urge said member to compress said pile, electro-magnetic means for moving said plunger out of operative relation with said member and electromagnetic means for controlling movement of said member for regulating purposes.

5. In combination, a compressible pile, a lever for operating said pile, a member for urging said lever to compact said pile, electromagnetic means for eliminating coaction between said member and said lever, and electromagnetic means for controlling said pile for regulating purposes.

6. In a system, in combination, a circuit to be regulated, a compressible pile for varying the resistance in said circuit for regulating purposes, a pair of electromagnets connected across said translation circuit on opposite sides of said pile, mechanism controlled by one of said electromagnets for varying the compression of said pile in response to voltage changes, and means controlled by the other of said electromagnets for urging said mechanism under certain conditions to tightly compress said pile, said other electromagnet being adapted under certain conditions to remove said means from operative relation with said mechanism.

7. In combination, a circuit to be regulated, a compressible pile in said circuit, means biased to compress said pile to reduce its resistance to a minimum, means adapted, upon rise in voltage across said circuit to overcome said biased condition, and electromagnetic means for controlling said pile for regulating purposes.

8. In combination, a compressible pile, a member for operating said pile, said member being provided with an abutment, a resiliently controlled member provided with abutting means coöperating with said abutment to compress said pile, electromagnetic means for eliminating coöperation between said abutment and said abutting means, and electromagnetic means for controlling said member for regulating purposes.

9. In combination, a compressible pile, mechanism for operating same, electromagnetic means for controlling said mechanism, resilient means for biasing said mechanism to tightly compress said pile, and electromagnetic means for removing said resilient means out of coöperative relation with said mechanism.

In witness whereof, I have hereunto subscribed my name.

ERNST BAUER.